Dec. 30, 1924.    1,521,508
R. DENOUX
REFLECTOR FOR USE ON MOTOR VEHICLES AND THE LIKE AND FOR ANALOGOUS PURPOSES
Filed Aug. 20, 1921

René Denoux,
Inventor
By Fetherstonhaugh & Co.
Attorneys

Patented Dec. 30, 1924.

1,521,508

UNITED STATES PATENT OFFICE.

RENÉ DENOUX, OF PARIS, FRANCE.

REFLECTOR FOR USE ON MOTOR VEHICLES AND THE LIKE AND FOR ANALOGOUS PURPOSES.

Application filed August 20, 1921. Serial No. 493,925.

(GRANTED UNDER THE PROVISIONS OF THE ACT OF MARCH 3, 1921, 41 STAT. L., 1313.)

*To all whom it may concern:*

Be it known that I, RENÉ DENOUX, a citizen of the Republic of France, and resident of Paris, France, have invented certain new and useful Improvements in Reflectors for Use on Motor Vehicles and the like and for Analogous Purposes (for which I have filed applications in France, June 15, 1921, Great Britain, June 18, 1921), of which the following is a specification.

This invention has for its object a reflector for use with automobile vehicles and for analogous purposes.

According to one feature of the invention the mirror mount is attached at a point coincident with its centre of gravity in order to prevent any displacement due to the action of shocks and vibrations whilst enabling it to be easily adjusted by hand without the necessity of gripping or locking. According to a further feature of the invention means are provided whereby the mirror may be fixed on any wind shield frames or other similar parts without risk of breakage of the glass.

One form of construction of the mirror according to the present invention is illustrated in the accompanying drawings to which reference will now be made.

Figure 1:
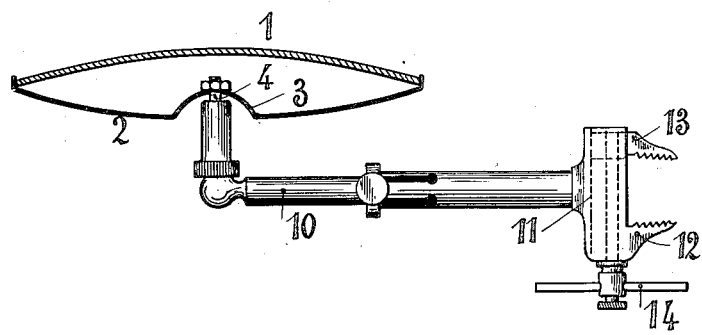
Fig. 1 is a plan view partly in section of the mirror.
Figure 2:
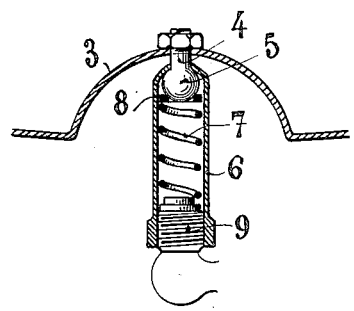
Fig. 2 is a section of a detail of the amount on an enlarged scale.

The mirror proper 1, which may be of any desired form and dimensions, but more particularly concave in order to obtain reflections over a wide field, is fixed in a metal mount 2 the centre of which comprises a sort of dish or recess 3. In the bottom of this dish 3 a rod 4 is fixed, the outer end of which forms a knuckle or ball joint 5. The arrangement of the mount 2 and the camber of the dish 3 are such that the ball joint 5 is placed as nearly as possible at the centre of gravity of the whole mirror.

A sleeve 6 is threaded over the rod 4 but has its end flanged inwardly to prevent the ball portion 5 from coming out. In the said sleeve a supporting spring 7 is arranged which is compressed between a small ring 8 bearing on the ball joint 5 and a threaded stopper or plug 9. The ring 8 need have only a circular aperture but it is preferable to promote the efficiency of the action of the spring that this aperture should be triangular, rectangular or polygonal.

The threaded stopper or plug 9 by its being adapted to be inserted to a variable extent allows of the pressure of the spring 7 being regulated so that ball 5 may move in its lodgement, that is to say, between the sleeve 6 and the ring 8 with more or less freedom according to the adjustment of the plug 9.

The stopper 9 forms the end of one of the arms of a bracket 10.

In this arrangement of my device the movement of the mount 2 and of the mirror 1 with relation to the bracket on which they are mounted may be controlled manually; but the ball joint 5 being positioned at the exact centre of gravity of the complete mirror mount serves to eliminate the probability of undesired, accidental disarrangements of the direction adjustment of the device from shocks, vibrations or jolts.

It is also evident that this arrangement may be adapted for use with all accessories or articles liable to the same requirements; such as head lights on motor cars, surgical apparatus, dentist appliances, lighting appliances and the like, and the present invention comprises all such applications.

The bracket 10 with or without an extension piece, has at its end a foot 11 with a gripping member. This gripping member is formed of a fixed part 12 and a movable part 13 the latter being adapted to be moved by a wing nut or the like 14. The inner faces of 12 and 13 are striated and are fashioned so that the distance between their bases is slightly greater than the distance between their two outer ends. This can be seen in Fig. 1.

The pressure exercised on a rod, bar or upright of any suitable section by a gripping member thus formed causes a pressure against the base of the foot 11 in such a way that it is gripped either on three faces of a rectangle or on an extended arc of a rounded bar.

As the gripping members 12, 13 thus grip strongly it is needless to elongate them, consequently they are not in contact with the faces of the part of the wind shield on which the mirror is very frequently mounted, so that there is thus no risk of breakage.

It is manifest that this grip may be applied to all appliances which comprises a similar kind of attachment, and the present invention covers any possible utilization.

Having now particularly described and ascertained the nature of my said invention, and in what manner the same is to be performed, I declare that what I claim is:

In a reflector and support therefor the combination of the following elements; a supporting bracket; a sleeve mounted thereon and provided with a threaded plug at its inner end and a seat at its outer end; a universal joint member mounted in the said seat; resilient adjusting means positioned between the said plug and the said universal joint member; a mirror secured at its center of gravity to the said universal joint member; and adjustable convergent gripping jaws on the said supporting bracket.

In witness whereof I have affixed my signature this 7th day of July 1921, in the presence of a subscribing witness.

RENÉ DENOUX.

Witness:
ANTONIN MONTEILHET.